US006656310B2

(12) United States Patent
Basque

(10) Patent No.: US 6,656,310 B2
(45) Date of Patent: Dec. 2, 2003

(54) HEAT SEALING JAW ASSEMBLY

(75) Inventor: Roland Basque, Brossard (CA)

(73) Assignee: Glopak Inc., Montreal (CA)

(*) Notice: Subject to any disclaimer, the term of this patent is extended or adjusted under 35 U.S.C. 154(b) by 233 days.

(21) Appl. No.: 09/878,602

(22) Filed: Jun. 11, 2001

(65) Prior Publication Data

US 2002/0117248 A1 Aug. 29, 2002

(30) Foreign Application Priority Data

Feb. 8, 2001 (CA) .............................................. 2334522

(51) Int. Cl.⁷ .......................... B32B 31/18; B32B 31/20; B30B 15/34
(52) U.S. Cl. ..................... 156/251; 156/275.1; 156/515; 156/583.1; 156/583.2
(58) Field of Search ................................. 156/251, 269, 156/272.2, 275.1, 292, 324, 379.8, 515, 530, 539, 543, 583.1, 583.2, 583.3

(56) References Cited

U.S. PATENT DOCUMENTS

| 3,623,933 A | * | 11/1971 | Staats | 156/552 |
| 3,840,420 A | * | 10/1974 | Sarcia | 156/358 |
| 4,115,182 A | * | 9/1978 | Wildmoser | 156/515 |
| 4,961,302 A | * | 10/1990 | Davis | 53/451 |
| 5,354,965 A | * | 10/1994 | Lee | 219/202 |
| 6,191,208 B1 | * | 2/2001 | Takahashi | 524/494 |

\* cited by examiner

Primary Examiner—Richard Crispino
Assistant Examiner—Cheryl N. Hawkins
(74) Attorney, Agent, or Firm—Carter Schnedler & Monteith

(57) ABSTRACT

A heat sealing jaw assembly for effecting a heat seal of at least two juxtaposed heat sealable sheet materials is described. Preferably, but not exclusively, the heat sealing jaw assembly is adapted for use in a form, fill and seal machine forming thermoplastic bags. The heat sealing jaw assembly comprises a first and a second metal jaw member, each having a heating element for heating the jaw members. Each of the jaw members has an end face disposed in facial alignment with one another. A ribbon member is secured to each of the end faces and disposed in planar alignment with one another. The ribbon member is made of soft material having rubber-like properties and capable of conducting heat from the sealing jaw to a fusing temperature to melt the heat sealable sheet materials. The first and second jaw members are reciprocatable towards and away from one another to press the aligned heated ribbon members against opposed sides of at least two juxtaposed heat sealable sheet materials disposed between the jaw members to effect a heat seal.

22 Claims, 5 Drawing Sheets

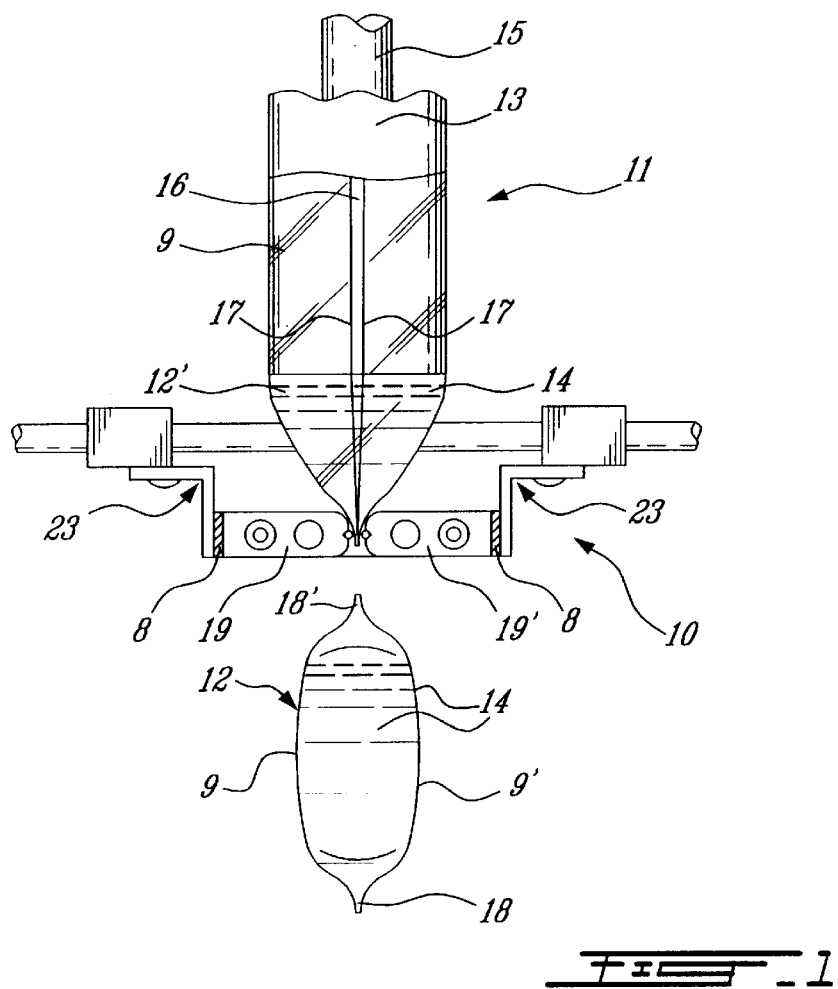
FIG_1
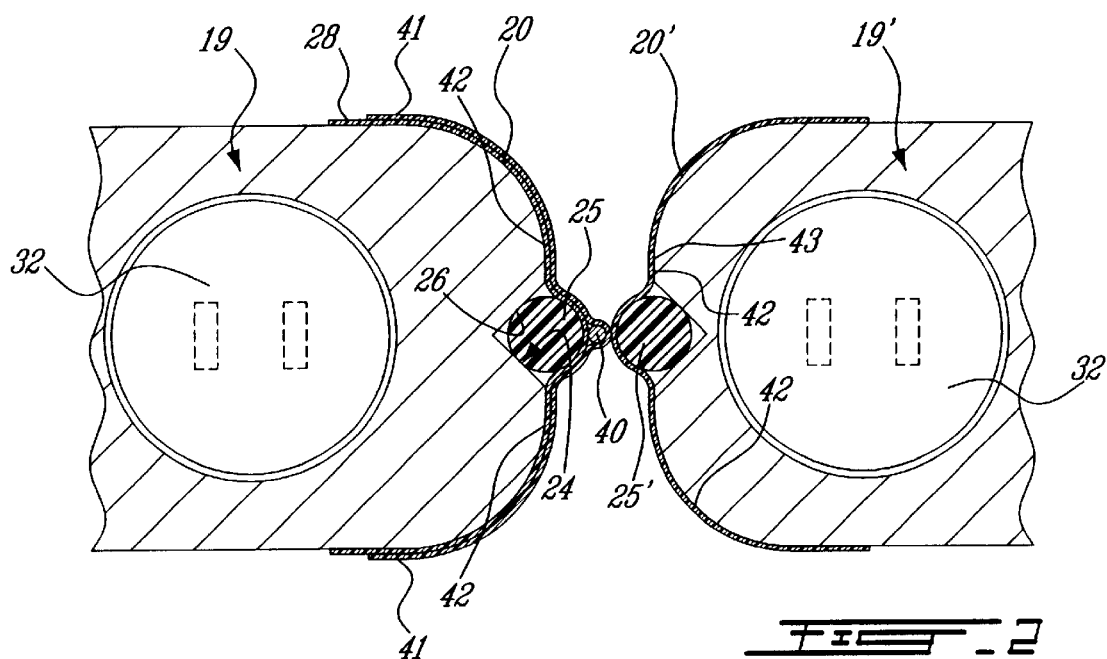
FIG_2

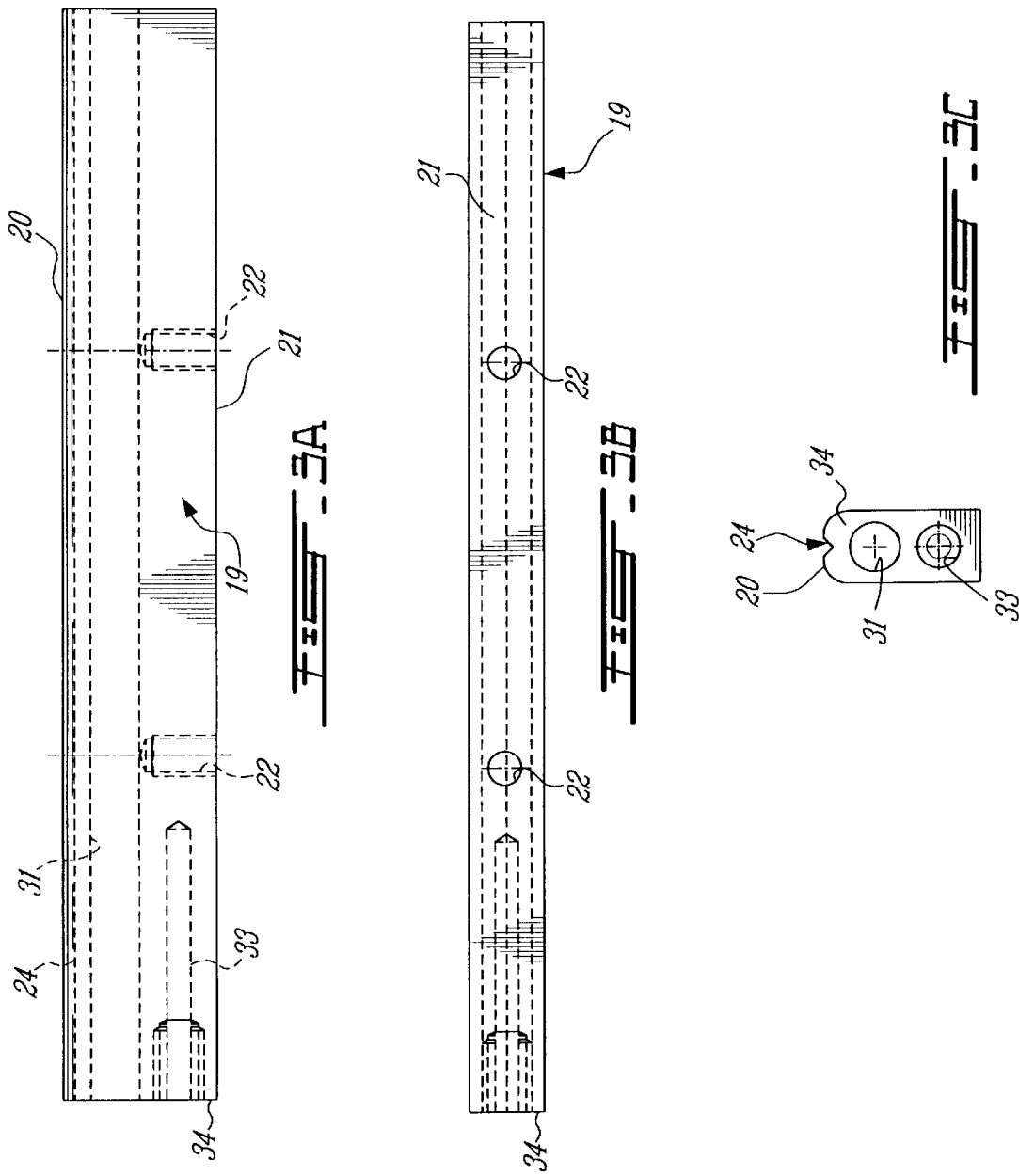

HEAT SEALING JAW ASSEMBLY

TECHNICAL FIELD

The present invention relates to a heat sealing jaw assembly and method of operation having a pair of metal jaw members each having a heat sealing member of soft material and capable of conducting heat to a fusing temperature of juxtaposed heat sealable sheet material disposed between the jaw members. More specifically, but not exclusively, such heat sealing jaw assembly is for use in sealing juxtaposed thermoplastic film material in a form, fill and seal machine.

BACKGROUND ART

Various types of heat sealing jaw assemblies are known in the prior art for sealing juxtaposed film materials, such as thermoplastic film to form sealed packages. These packages or pouches, may be preformed and then later filled with a product and then sealed or else the pouches can be formed simultaneously as they are being filled such as in a form, fill and seal machine. U.S. Pat. No. 5,326,416 is referenced for describing such a heat sealing assembly in a vertical form, fill and seal machine for packaging flowable materials. Such assemblies comprise two jaws, resilient clamping elements and a heat sealing element. At least one of the jaws is capable of transverse motion and adapted to collapse a tubular film made from thermoplastic film material passing between the jaws. The clamping assembly is adapted to grip thermoplastic film which passes therebetween and urge the grip film towards the jaws when the jaw closes and release the film when the jaw opens. One of the jaws is provided with a heat sealing element secured to the clamping face and the other jaw is provided with a heat resistant resilient pad, such as silicone rubber.

When the film tube is collapsed there are two juxtaposed film sheets. To fuse the juxtaposed film sheet, heat must pass from an outer face of one of the film sheets and through the other sheet and to its back face to achieve a complete seal. As the seal is formed from one side of the first film sheet to the outer side of the second film sheet, the temperature of the sealing element falls drastically. Therefore, it is necessary that the sealing element be hot enough to achieve the complete seal across both film sheets. Therefore, the first film sheet is subjected to a higher sealing or melting temperature than the second sheet and this often causes imperfect seals and leakage of the contents results. It can also result in machine stoppage and this becomes very costly. The speed of the sealing operation of the machine is also limited by the speed or fusing time of the sealing jaws.

Another disadvantage of prior art sealing jaws is that the sealing element is constructed of metal and a layer of woven glass fiber cloth is usually disposed thereover. This makes for a very rigid sealing face structure and if there is a crease in the juxtaposed film sheets, the film may be damaged by the rigid sealing head which does not absorb the imperfections in the film caused by the creases and the film could be punctured. Furthermore, the prior art sealing heads usually have a pointed end or are provided with a hot wire whereby the seal and the slitting is formed simultaneously. With a sealing head having an integrally formed pointed slitting head, the temperature at the slitting point is substantially the same as the temperature of the sealing side walls of the head forming the seal. Accordingly, the temperature of the slitting element is not controlled independently of the sealing head and again this may result in an imperfect seal and leakage.

SUMMARY OF INVENTION

It is a feature of the present invention to provide a heat sealing jaw assembly and method of operation which overcomes the above-mentioned disadvantages of the prior art and which can achieve better seal performance at much greater sealing speeds.

Another feature of the present invention is to provide a heat sealing jaw assembly and method of operation wherein the temperature of the sealing heads and the cutting or slitting element are independently controlled.

Another feature of the present invention is to provide a heat sealing jaw assembly and method of operation and wherein the sealing jaw members are each provided with a ribbon member of soft material having rubber-like properties and which is capable of conducting heat from the sealing jaw to a fusing temperature of at least two juxtaposed heat sealable sheet materials and wherein a seal is formed from opposed sides of the juxtaposed sheets.

According to the above features, from a broad aspect, the present invention provides a heat sealing jaw assembly for effecting a heat seal of at least two juxtaposed heat sealable sheet materials. The heat sealing jaw assembly comprises a first and a second metal jaw member each having a heating element for heating the jaw members. Each jaw member has an end face disposed in facial alignment with one another. A heat conductive sealing member is secured to each of the end faces and disposed in planar alignment with one another. The heat sealing member is of a soft material having rubber-like properties and capable of conducting heat from the sealing jaw members to a fusing temperature to melt the heat sealable sheet materials. The first and second jaw members are reciprocable towards and away from one another to press the aligned heated sealing members against opposed sides of at least two juxtaposed heat sealable sheet materials disposed between the jaw members to effect a heat seal from opposed sides of the juxtaposed sheets.

According to a further broad aspect of the present invention, there is provided a cutting metal slitting wire disposed forwardly and substantially centrally along one of the heat sealing members and heated independently to effect a cut in the heat seal.

According to a further broad aspect of the present invention the temperature of the heat sealing metal jaw members are controlled independently from one another.

According to a further broad aspect of the present invention there is provided a method of forming a heat seal between juxtaposed heat sealable sheet material, said method comprising the steps of: (i) providing a pair of metal jaw members having heating means for heating same to a desirable temperature, each said jaw member having an end face with said end faces disposed in facial alignment, means to reciprocate said jaws towards and away from one another, (ii) providing a heat conductive sealing member of soft rubber-like material along at least a common section of each said end faces in contact therewith to conduct heat from said jaw members to a fusing temperature to melt said heat sealable sheet materials, and (iii) displacing said jaw members towards one another to press said heat conductive sealing members against said juxtaposed heat sealable sheet material from opposed sides of said sheet material and with said heat conductive sealing members in planar alignment with one another to fuse said materials and seal them together along a seal line and from opposed sides of the juxtaposed sheets.

BRIEF DESCRIPTION OF DRAWINGS

A preferred embodiment of the present invention will now be described with reference to the example thereof as illustrated in the accompanying drawings and wherein:

FIG. 1 is a simplified side view illustrating the heat sealing jaw assembly of the present invention adapted to a vertical form, fill and seal machine for packaging a flowable material in thermoplastic bags formed by the machine;

FIG. 2 is an enlarged fragmented side section view illustrating the construction of the jaw members;

FIG. 3A is a top plan view of one of the metal jaw members;

FIG. 3B is a rear view of the metal jaw member;

FIG. 3C is an end view of the metal jaw member of FIG. 3A;

DESCRIPTION OF PREFERRED EMBODIMENTS

Figure 4:
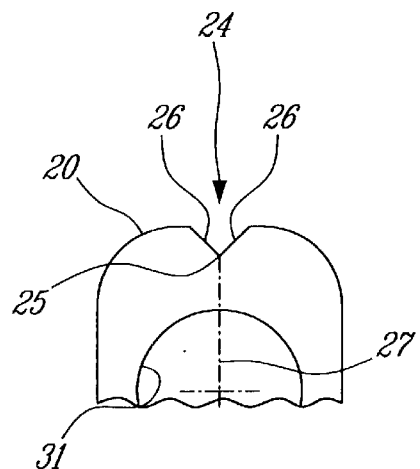
FIG. 4 is an enlarged fragmented end view showing the cross-section of the elongated cavity formed in the end face of the jaw member of FIG. 3A.

Referring to the drawings, and more particularly to FIG. 1, there is shown the heat sealing jaw assembly 10 of the present invention secured in a vertical form, fill and seal machine 11 of a type well known in the art. A thermoplastic bag 12 is formed about a forming tube 13 of the machine simultaneously as a flowable material 14 is continuously injected within the bag being formed through a filling tube 15. A vertical seal 16 is formed above the overlapped ends 17 of the film sheet 9 as the liquid is injected into the bag being formed. The sealing jaws 10 are reciprocated and as hereinshown are closed to form a horizontal seal 18 first at a lower end of the bag being formed 12' and then at the top end 18' of the filled bag 12. The jaw members 19 and 19' are reciprocated by a controlled mechanism (not shown) and dependent on the sealing time of the jaw members. The jaw assembly as hereinshown is simplified and other clamping elements may be associated therewith to maintain the juxtaposed film sheets of the plastic bag or pouch being formed whereby the juxtaposed film sheets are held substantially flat one against the other, as is well known to a person skilled in the art.

With reference now to FIGS. 2 to 4, there will be described the construction of the heat sealing jaws of the present invention. As shown in FIGS. 3A to 3C, the jaw members 19 are elongated rectangular steel bars and are each provided with an end face 20 and a flat rear face 21. A pair of threaded bores 22 are formed in the rear face whereby to secure the jaw member 19 to a reciprocable frame 23 schematically shown in FIG. 1. The front end face 20 has a straight elongated cavity 24 formed therealong. As shown in FIG. 4, this cavity 24 is of V-shaped cross-section and dimensioned to receive an elongated sealing member, therein a ribbon member 25, as will be described later. As hereinshown the cavity 24 is a right angle V-shaped cavity defining an apex 25 and opposed flat side walls 26 through which heat is transferred to the ribbons 25. The apex is disposed on a central longitudinal axis 27 of the jaw member.

As shown in FIG. 2, each of the jaw members 19 and 19' have an elongated ribbon member 25 and 25' secured partly in their cavities by a thin Teflon polytetrafluoroethylene (PTFE) fabric 28 adhered to the front end face 20 and 20' of the jaw member 19 and 19'. The ribbon member 25 is of circular cross-section and is held firmly seated into its cavity 24. The ribbon member 25 is of a soft material having rubber-like properties and capable of conducting heat from the steel jaw and through the side faces 26 of the cavity 24. Accordingly, the ribbon members will be heated by the jaw and form the sealing heads. These ribbons also protrude outside the front end face 20 of the sealing jaws sufficiently to be compressed within the cavity and form a band seal.

Figure 6:
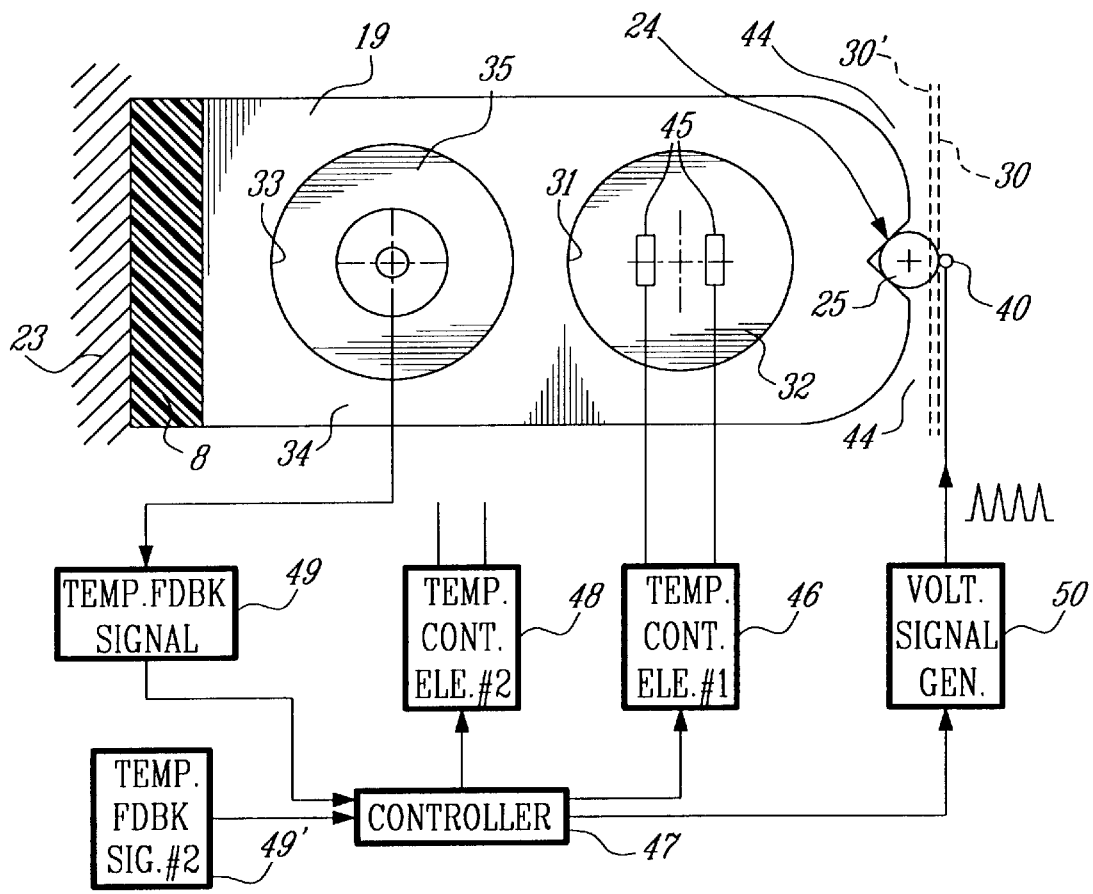
FIG. 6 is an end view of a jaw member of the heat sealing jaw assembly and illustrating a simplified block diagram of the temperature control circuit.

FIG. 6 illustrates, at 30, the compression distance of these ribbons. Also, as the ribbons compress, they form a greater contact with the side faces 26 of the cavity 24 and provide better heat transfer. The Teflon fabric 28 will also flex in the area of the ribbon and it is utilized for maintaining the ribbon in place and as well for its non-stick property whereby the fused plastic film material will not stick to the sealing heads when the juxtaposed film sheets are pressed together under pressure from both sides by the sealing jaws 19 and 19'.

The ribbon members 25 and 25' are hereinshown as being of circular cross-section but it is conceivable that the cross-sectional shape of these ribbons may be different such as hexagonal, square, or various other shapes as is obvious to a person skilled in the art. The ribbons may also be flat strips secured to the end face 20 which may be entirely flat with no cavity.

These rubber-like ribbon members have properties capable of conducting heat up to at least a temperature of 300° C. Such material is a perfluoroelastomeric substance and may include one of Kalrez 4079, Kalrez 1050LF, Kalrez 1058, Kalrez 3018, Kalrez 2035, Kalrez 2037, all registered trademarks of DuPont Dow Elastomers, or Chemraz, a registered trademark of Green, Tweed & Co.

Referring again to FIGS. 3A to 3C, it can be seen that the steel jaw members 19 and 19' are provided with a forward elongated throughbore 31 disposed longitudinally in spaced parallel relationship behind the cavity 24 and aligned on the central longitudinal axis 27 of the jaw member and the cavity 24. A heat cartridge 32 is disposed in close contact within the throughbore 31 as illustrated in FIG. 6. A second bore 33 is formed in one of the side end walls 34 and extends partly within the jaw member whereby to receive a thermocouple heat sensing element 35 in close fit therein whereby to monitor the temperature of the steel jaw member and hence the temperature of the ribbon member 25 associated therewith.

Referring again to FIG. 2, it can be seen that an electrically conductive metal slitting wire 40 is held forwardly and substantially centrally along one of the ribbon members, herein ribbon member 25 by a second sheet of Teflon fabric 41 bonded on top of the first sheet 28 and it also has good heat conducting and non-stick properties. This metal slitting wire 40 constitutes a cutting means for the jaws but it is conceivable that these jaws may be used without a slitting wire, merely to form a seal and the seal can then be slit in another stage or at a later time by a knife or other slitting means. Accordingly, the metal slitting wire 40 and its disposition as herein illustrated in FIG. 2 illustrates a means of forming a seal and simultaneously slitting it in a vertical fill, form and seal machine but the sealing jaw assembly of the present invention is not to be limited thereto. These slitting wires are usually nicrome metal wires and they are connected to a voltage signal generator whereby the wire becomes very hot as an electrical pulse is applied thereto and slits the thermoplastic film material when receiving the pulse. Such slitting wires are well known in the art.

Referring still to FIG. 2, it can be seen that the front end faces 20 and 20' of the sealing bars have a flat central area 42 in which the cavities 24 are disposed. To each side of the cavity the end face has opposed convex smooth side sections 43 which taper rearwardly of the end face to form a clearance gap 44 to each side of the sealing head as illustrated in FIG. 6 and rearwardly of the compression axis 30' when both sealing heads are brought in compression contact against opposed sides of juxtaposed film sheets 9 and 9' of a bag 12 being formed and as illustrated in FIG. 1.

With reference now to FIG. 6, there will be described how the temperature of the ribbon members 25 and 25' and the metal slitting wire 40 are controlled to achieve high sealing speeds. As hereinshown, the heat cartridge 32 of the first jaw member 19 has its terminals 45 secured to a temperature control supply 46 which is regulated by a controller 47 which may be a programmable PC or other controller configuration. A second independent temperature control device 48 is connected to the other sealing jaw 19', not shown, and to the controller 47. Accordingly, the temperature of the jaws is controlled independently whereby to form a perfect seal for the juxtaposed sealable sheet material. The jaws may operate at different temperatures as the sealable material may comprise of different layers of thermoplastic film sheets or the composite film sheet material having differing material sheets. To control the temperature of the sealing jaw, the thermocouple element 35 is connected to a temperature feedback signal analyzing circuit 49 and 49' which feeds the controller 47. The metal slitting wire 40 is fed a voltage signal by a voltage generator 50 which is also controlled by the controller 47. The controller 47 thus controls the magnitude of the voltage signal as well as the time duration thereof and this again is dependent on the type of materials being fused and slit. Accordingly, it can be seen that with the present invention the temperature of each of the sealing ribbons as well as the slitting wire can be independently controlled and these are all adjusted whereby to achieve a seal having a desired quality.

Figure 5:
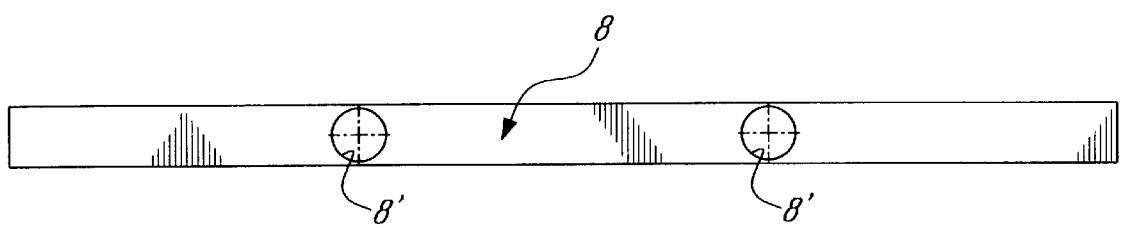
FIG. 5 is a plan view of an insulating strip.

As shown in FIG. 6, a heat barrier strip 8, as shown in FIG. 5, having holes 8' therein is secured to the flat rear face 21 of each of the sealing bars to insulate the hot sealing bars 19 and 19' from their support frame 23.

As previously described, the sealing jaw of the present invention seals the overlapped film sheets 9 and 9' from opposed sides thereof. Accordingly, it is only necessary that the temperature of each of the ribbons be selected to melt the film sheet or sheets on its side. If the other side has two film sheets or a different type of film sheet, then the temperature of that ribbon will be different from the other, as mentioned above.

Figure 7A:
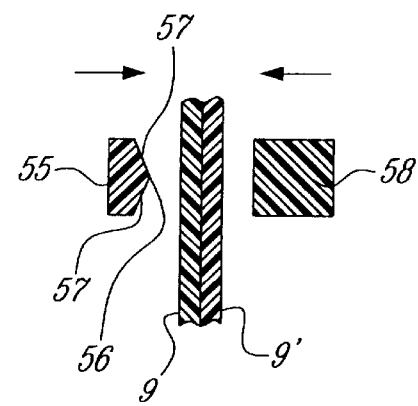
FIG. 7A is a simplified schematic view of a prior art heat sealing jaws.
Figure 7B:
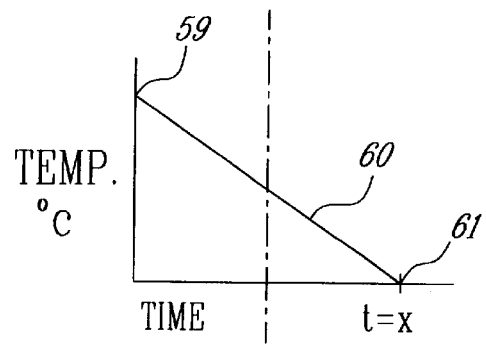
FIG. 7B is a graph showing the performance of the prior art heat sealing jaws.

FIGS. 7A and 7B illustrate a common prior art sealing head as referred to in the preamble of the present specification. As shown in FIG. 7A, the sealing head 55 is a metal head having a V-shaped front wall defining a slitting apex 56 and opposed rearwardly sloped sealing side walls 57. A heat resistant resilient pad 58 is secured to the other jaw member. When the jaw members are brought together, the sealing head 58 must melt both film sheets 9 and 9'. Accordingly, when the sealing head 55 contacts sheet 9, it is at its highest temperature as illustrated at 59 in the FIG. 7B graph and this temperature will decrease as illustrated by line 60 until both film sheets 9 and 9' are fused together and the films are slit at time T=X designated by reference number 61.

Figure 8A:
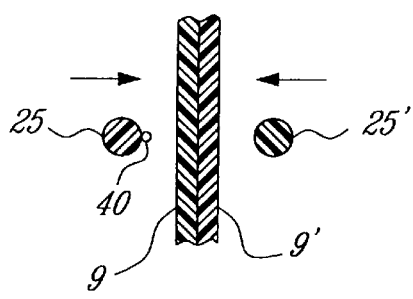
FIG. 8A is a schematic diagram showing the heat sealing jaws of the present invention.
Figure 8B:
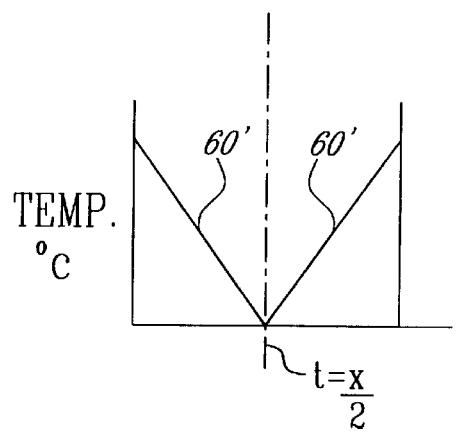
FIG. 8B is a graph showing the performance of the heat sealing jaws of the present invention.

Comparing now the formation of a seal with the sealing jaws of the present invention, reference is made to FIGS. 8A and 8B. As shown in FIG. 8A, both sealing ribbons 25 and 25' are brought in contact with the film sheets 9 and 9' from opposed sides thereof. Accordingly, one of the ribbons need only melt one of the film sheets to form the seal as each film is melting independently from one another and the melted plastic meets at their face of contact. If there are more sheets on one side than on the other, then one of the seals will operate at a higher temperature. The instant the seal is formed, the slitting wire is sent a voltage pulse to slit the seal substantially at the midpoint of the seal.

As shown in FIG. 8A with the sealing jaw of the present invention, only half the time, as compared with the prior art device illustrated in FIG. 7B, is required to form the seal as each sealing head only fuses half of the overlapped film sheets. Also, unlike the prior art, with the sealing jaws of the present invention the heat travels from the outside of each film and propagates inwardly form both sides. Further, the temperature of the slitting wire is controlled independently. Therefore, with the present invention we can control the sealing temperature to seal and the cutting temperature and pulse time to cut. With the prior art as illustrated in FIGS. 7A and 7B, which is a single stage sealing and slitting head, it is not possible to achieve this control. With the prior art the film on the back side gets heated last and the melting temperature of the head is different from the melting temperature of the head when impacting the first film sheet and this often results in imperfect seals. With the present invention there is achieved better seal performance and at much higher speeds. Because with the prior art you need to find the right temperature of the sealing head to both seal and cut, and the temperature has to be hot enough to go through all of the juxtaposed film sheets, you compromise sealing temperature for the cutting or slitting temperature or viceversa. This is a major disadvantage which is overcome by the present invention. Also as illustrated in FIG. 8 the fusing time curve 60' is much shorter than the prior art and it takes approximately half the time to form the seal and slit the juxtaposed thermoplastic sheet materials.

The method of operation can be summarized as follows. First, the temperature of both sealing metal jaw members is determined dependent on the juxtaposed film sheet material requiring to be sealed. A desired temperature is set in the controller. The controller then adjusts the supply voltage to a heat cartridge in each of the sealing heads independently to bring the ribbon to its desired temperature. A thermocouple element monitors the temperature of the jaw member and feeds a temperature signal to the controller whereby the controller adjusts the voltage supply to the heat cartridge if the temperature has to be increased whereby the jaw member may be maintained at a substantially desirable temperature. The controller also controls a voltage signal generator which feeds voltage impulses to the slitting wire to slit the seal formed by the ribbons and at the appropriate moment in the sealing sequence. Accordingly, with the present invention seals can be made and slit much faster than the prior art and are automatically controllable whereby to achieve the desired result of forming a seal at a much faster rate. Also, because the ribbons have of a soft spongy property, they do not damage the juxtaposed heat sealable sheet materials when in sealing pressure contact therewith, particularly if there are creases in the sheet materials as such creases will be absorbed by the soft properties of the sealing ribbons.

It is within the ambit of the present invention to cover any obvious modifications of the preferred embodiment described herein, provided such modifications fall within the scope of the appended claims.

What is claimed is:

1. A heat sealing jaw assembly for effecting a heat seal of at least two juxtaposed heat sealable sheet materials, said heat sealing jaw assembly comprising a first and a second metal jaw member each having a heating element for heating said jaw members, each said jaw member having an end face disposed in facial alignment with one another, a heat conductive sealing member secured to each said end faces and disposed in planar alignment with one another, said heat sealing member being of a soft material having rubber-like properties and capable of conducting heat from said sealing jaw members to a fusing temperature to melt said heat sealable sheet materials, said first and second jaw members being reciprocable towards and away from one another to press said aligned heated sealing members against opposed sides of two juxtaposed heat sealable sheet materials disposed between said jaw members to effect said heat seal from opposed sides of said juxtaposed sheets and cutting means to cut said heat sealable sheet materials along said heat seal simultaneously with the formation of said heat seal.

2. A heat sealing jaw assembly as claimed in claim 1 wherein said heat conductive sealing member is a heat sealing ribbon member.

3. A heat sealing jaw assembly as claimed in claim 1 wherein said end face of each said jaw members is a straight end face, each end face having a straight elongated cavity therein shaped to receive at least a cross-sectional portion of said ribbon member therein.

4. A heat sealing jaw assembly as claimed in claim 1 wherein said cutting means is an electrically conductive metal slitting wire, said wire being disposed forwardly and substantially centrally along one of said ribbon members and heated to effect a slit in said heat seal.

5. A heat sealing jaw assembly as claimed in claim 3 wherein said ribbon member is held in contact with said elongated cavity by a heat conducting material having non-stick properties with respect to juxtaposed heat sealable sheet materials to be sealed.

6. A heat sealing jaw assembly as claimed in claim 5 wherein said heat conducting material is a polytetrafluoroethylene (PTFE) sheet bonded over said ribbon member and said end face of said jaw member associated therewith.

7. A heat sealing jaw assembly as claimed in claim 6 wherein said electrically conductive wire is a nicrome metal wire held captive between said polytetrafluoroethylene (PTFE) sheet and a further PTFE sheet bonded thereover.

8. A heat sealing jaw assembly as claimed in claim 3 wherein said elongated cavity is of V-shaped cross-section, said ribbon member having a circular cross-section.

9. A heat sealing jaw assembly as claimed in claim 2 wherein said ribbon member is capable of conducting heat to at least a temperature of 300° C.

10. A heat sealing jaw assembly as claimed in claim 2 wherein said ribbon member is a perfluoroelastomeric substance.

11. A heat sealing jaw assembly as claimed in claim 4 wherein said metal jaw members are elongated steel bars of rectangular cross-section, said end face having a flat central area in which said cavity is disposed, said end face having opposed convex smooth side sections.

12. A heat sealing jaw assembly as claimed in claim 11 wherein said steel bars each have a forward elongated throughbore disposed longitudinally in spaced parallel relationship with said cavity and aligned on a central longitudinal axis of said cavity, said elongated throughbore having a heat cartridge therein for heating said steel bar, a second bore is spaced from said first throughbore for receiving a thermocouple element therein for monitoring the temperature of said steel bar and hence the temperature of said ribbon member.

13. A heat sealing jaw assembly as claimed in claim 12 wherein said heat cartridge of each said sealing bars is connected to a respective controllable voltage supply to control the temperature of said sealing bars independently from one another with said thermocouples providing a feedback signal to a controller circuit corresponding to the actual temperature of said steel bars, said electrically conductive metal slitting wire being connected to a time controlled variable voltage supply which is adjusted to a desirable slitting temperature and time dependent on the fused material being sealed.

14. A heat sealing jaw assembly as claimed in claim 13 wherein said controller circuit is a computer controlled controller circuit.

15. A heat sealing jaw assembly as claimed in claim 13 wherein said heat sealing jaw assembly is a horizontal sealing jaw assembly in a form, fill and seal machine; said juxtaposed heat sealable sheet materials being thermoplastic film materials.

16. A heat sealing jaw assembly as claimed in claim 13 wherein said sealing bars are heated to a predetermined desired temperature whereby said ribbon elements will melt a respective one of juxtaposed heat sealable sheet materials with heat propagating from both sides of said juxtaposed heat sealable sheet materials towards their juxtaposed faces to fuse the materials together and form said heat seal.

17. A heat sealing jaw assembly as claimed in claim 16 wherein said heat seal is formed during a time period only sufficient to fuse half of said juxtaposed heat sealable sheet materials and an electrical pulse fed to said slitting wire during said time period.

18. A heat sealing jaw assembly as claimed in claim 17 wherein said juxtaposed heat sealable sheet materials are thermoplastic film materials.

19. A heat sealing jaw assembly as claimed in claim 8 wherein said V-shaped cavity is a right angle V-shaped cavity defining an apex and opposed side walls, said apex being disposed on a central longitudinal axis of said jaw members, said side walls contacting said ribbon element disposed in said V-shaped groove to conduct heat to said ribbon element.

20. A heat sealing jaw assembly as claimed in claim 19 wherein said ribbon element has a soft springy property thereby not damaging said juxtaposed heat sealable sheet materials when in sealing pressure contact therewith.

21. A method of forming a heat seal between juxtaposed heat sealable sheet materials, said method comprising the steps of:

(i) providing a pair of metal jaw members having heating means for heating same to a desirable temperature, each said jaw member having an end face with said end jaws disposed in facial alignment, means to reciprocate said jaws towards and away from one another, (ii) providing a heat conductive sealing member of soft rubber-like material along at least a common section of each said end faces in contact therewith to conduct heat from said jaw members to a fusing temperature to melt said heat sealable sheet materials, (iii) displacing said jaw members towards one another to press said heat conductive sealing members against said juxtaposed heat sealable sheet material from opposed sides of said sheet material and with said heat conductive sealing members in planar alignment with one another to fuse said materials and seal them together along a seal line, and (iv) applying an electrical pulse to a metal slitting wire, secured forwardly and substantially centrally along one of said heat conducting sealing members, and at a predetermined time during said fusing step to slit said juxtaposed sheet materials substantially centrally of said seal line.

22. A method as claimed in claim 21 wherein said heat conductive sealing members are ribbon members of predetermined cross-section secured in contact with said end faces of said first and second metal jaw members.

* * * * *